United States Patent
Weitzel et al.

(10) Patent No.: US 11,591,423 B2
(45) Date of Patent: Feb. 28, 2023

(54) METHOD FOR PRODUCING AQUEOUS POLYMER DISPERSIONS IN A TUBE REACTOR

(71) Applicant: WACKER CHEMIE AG, Munich (DE)

(72) Inventors: Hans-Peter Weitzel, Reischach (DE); Robert Braunsperger, Emmerting (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 17/264,671

(22) PCT Filed: Apr. 30, 2019

(86) PCT No.: PCT/EP2019/061017
§ 371 (c)(1),
(2) Date: Jan. 29, 2021

(87) PCT Pub. No.: WO2020/221435
PCT Pub. Date: Nov. 5, 2020

(65) Prior Publication Data
US 2022/0041774 A1   Feb. 10, 2022

(51) Int. Cl.
*C08F 218/08*  (2006.01)
*C08L 29/04*  (2006.01)

(52) U.S. Cl.
CPC ................. *C08F 218/08* (2013.01)

(58) Field of Classification Search
CPC ............................. C08F 218/08; C08L 29/04
USPC ........................................................ 526/64
See application file for complete search history.

(56) References Cited

U.S. PATENT DOCUMENTS

| | | | |
|---|---|---|---|
| 3,215,506 A | 11/1965 | Keil et al. | |
| 4,271,007 A | 6/1981 | Souhrada et al. | |
| 4,371,007 A * | 2/1983 | Scheffel | D03D 47/278 139/435.6 |
| 2003/0125451 A1 | 7/2003 | Weitzel et al. | |
| 2004/0097645 A1* | 5/2004 | Weitzel | C04B 28/02 524/803 |
| 2007/0112117 A1* | 5/2007 | Weitzel | C08F 2/20 524/459 |
| 2014/0094542 A1* | 4/2014 | Faatz | C08F 2/30 524/5 |
| 2018/0002467 A1* | 1/2018 | Babar | C08F 2/24 |
| 2018/0282440 A1 | 10/2018 | Babar et al. | |

FOREIGN PATENT DOCUMENTS

| | | |
|---|---|---|
| DE | 1137216 B | 9/1962 |
| DE | 102011076407 A1 | 11/2012 |
| EP | 0029701 B1 | 9/1985 |
| EP | 1323752 B1 | 3/2004 |
| EP | 1420033 B2 | 2/2009 |
| EP | 1788001 B1 | 8/2010 |
| EP | 3256497 B1 | 9/2018 |
| WO | 2009023515 A2 | 2/2009 |
| WO | 2016128502 A1 | 8/2016 |

OTHER PUBLICATIONS

T. G. Fox, Bulletin of the American Physics Society, 1956, vol. 1, No. 3, p. 123.
J. Brandrup et al., Polymer Handbook, 2nd Edition, 1975, Wiley & Sons, New York.

* cited by examiner

*Primary Examiner* — Michael M. Bernshteyn
(74) *Attorney, Agent, or Firm* — Brooks Kushman P.C.

(57) ABSTRACT

Aqueous polymer dispersions are produced by radically initiated emulsion polymerization of ethylenically unsaturated monomers in the presence of protective colloids and/or emulsifiers in a continuously operated tubular reactor, characterized in that the direction of flow of the reactor contents is reversed along the longitudinal axis of the reactor over the course of polymerization.

10 Claims, 1 Drawing Sheet

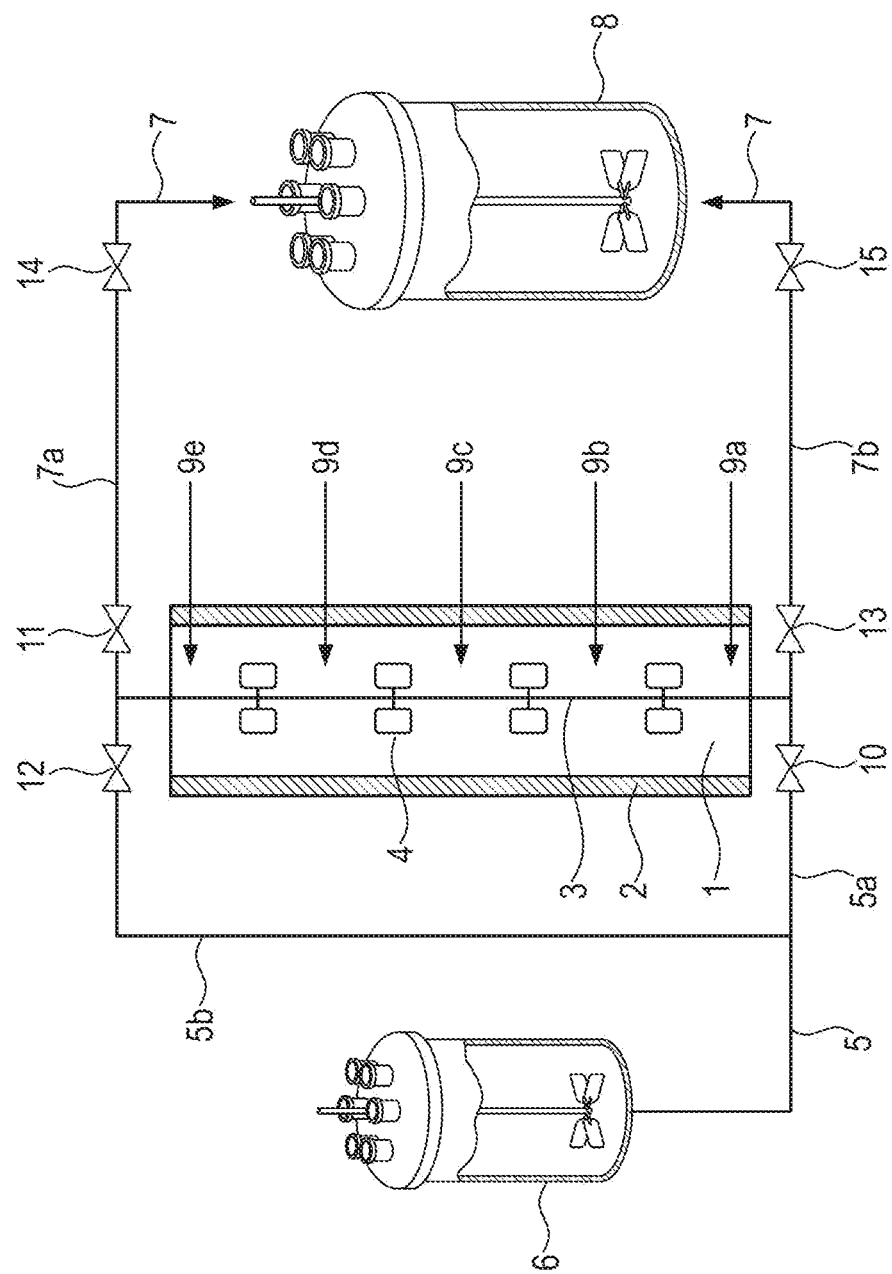

METHOD FOR PRODUCING AQUEOUS POLYMER DISPERSIONS IN A TUBE REACTOR

CROSS REFERENCE TO RELATED APPLICATIONS

This application is the U.S. National Phase of PCT Appln. No. PCT/EP2019/061017 filed Apr. 30, 2019, the disclosure of which is incorporated in its entirety by reference herein.

BACKGROUND OF THE INVENTION

1. Field of the Invention

The invention relates to a process for producing aqueous polymer dispersions by means of radically initiated emulsion polymerization of ethylenically unsaturated monomers in the presence of protective colloids and/or emulsifiers in a continuously operated tubular reactor, and the use of the process products obtained therefrom.

2. Description of the Related Art

Aqueous polymer dispersions are used as binders in a wide range of applications, for example in adhesives, coating applications, as binders in carpet, textile and paper applications, and in construction chemical products such as for example tile adhesives, renders and sealants. These aqueous dispersions are usually produced by aqueous emulsion polymerization in stirred batch reactors or also in continuous stirred tank cascades, as described in EP 1 323 752 B1.

The process efficiency is limited by the dissipation of the released heat via cooling surfaces, for example cooling coils and reactor wall. For this reason, there have been repeated investigations into transferring the process from stirred tanks to tubular reactors without internals in order to benefit from the larger surface-to-volume ratio and correspondingly better cooling. Unfortunately, it was found that with a correspondingly narrow tube cross-section, these tubular reactors quickly become clogged by deposits, known as fouling (polymer fouling), and the system operating time is drastically reduced.

As a solution, tubular reactors with built-in stirrers have been used. But even in this case, polymer fouling cannot be avoided and this limits the availability of the system. This polymer fouling also occurs in traditional stirred tanks, but the impairment of system availability in the case of stirred tanks is not as serious as with tubular reactors due to the smaller cooling surface and modified reactor geometry. In stirred tanks, build-up of deposits is helped to slow down by coating the surfaces with antifouling agents, as described in EP 3 256 497 B1. However, this effect is insufficient in tubular reactors. DE-AS 1137216 describes a tubular reactor having a close-clearance stirrer or scraper. In this procedure, the wall deposit is not prevented but is removed mechanically by a subsequent measure. Therefore, on a production scale, problems must be expected due to the narrow gaps between the stirrer or scraper and the wall, mechanical load and corresponding blockages due to abraded wall deposits. In EP 0 029 701 B1, the wall deposits that form in a tubular reactor through which liquid flows are removed again from the reactor by pulsating flow.

The object was to provide an improved process for producing aqueous polymer dispersions that ensures high system availability while at the same time high space-time yield (process efficiency).

SUMMARY OF THE INVENTION

The invention relates to a process for producing aqueous polymer dispersions by means of radically initiated emulsion polymerization of ethylenically unsaturated monomers in the presence of protective colloids and/or emulsifiers in a continuously operated tubular reactor, characterized in that the direction of flow of the reactor contents (polymerization mixture) is reversed along the longitudinal axis of the reactor at regular time intervals.

BRIEF DESCRIPTION OF THE DRAWINGS

FIG. 1 illustrates one embodiment of the method of the invention.

DETAILED DESCRIPTION OF THE PREFERRED EMBODIMENTS

The process according to the invention can be applied in principle to all reactors having tubular geometry. This includes, for example, stirred tubular reactors, unstirred tubular reactors, tubular reactors with internals such as static mixing elements, and Taylor reactors having a cylindrical stirrer. Preference is given to stirred tubular reactors.

The tubular reactor preferably has a cylindrical geometry. The tubular reactor is largely characterized by the ratio of length to diameter. The ratio of length to diameter is preferably from 8:1 to 40:1, more preferably from 10:1 to 25:1. At smaller ratios, the geometry is too similar to that of traditional stirred tanks, with high back-mixing of the medium to be reacted. At larger values, the reactor becomes very long which limits practical implementation since the tubular reactor is preferably vertical and is limited by the dimensions of the building.

The tubular reactor can, viewed in the longitudinal direction or in the direction of flow, be stored vertically, horizontally or in a position between these two directions. The longitudinal direction of the tubular reactor is generally the distance from the reactor floor to the reactor cover. Vertical storage is preferred. If the tubular reactor is not stored horizontally, the reaction medium can flow through it from top to bottom under gravity or, preferably, against gravity from bottom to top.

A stirred tubular reactor can employ any stirrer technology, the stirring elements preferably being made up of simple paddle stirrers.

The speed of the stirrer depends on the overall dimensions of the reactor and is between 200 and 2000 revolutions per minute, preferably between 500 and 1500 revolutions per minute. One revolution means one revolution of the stirrer around its longitudinal axis or around the axis that is parallel to the direction of flow. The stirrer can be driven in a conventional manner, for example by a mechanical gear, and sealed by means of a magnetic coupling or a mechanical seal.

The mean residence time of the polymerization mixture in the tubular reactor is generally 10 minutes to 5 hours, preferably 15 minutes to 2 hours, more preferably 20 minutes to 1 hour and most preferably 25 minutes to 45 minutes.

The mean residence time can be adjusted, for example, by means of the speed of metered addition or the dimensions of the tubular reactor.

The direction of flow of the tubular reactor contents is preferably reversed within a time gap (time interval) of 60 minutes to 48 hours, more preferably the direction of flow is reversed within a time gap (time interval) of 6 hours to 12 hours.

A preferred configuration of a tubular reactor for carrying out the process according to the invention is shown by way of example in FIG. 1 as a tubular reactor (1). The embodiment in FIG. 1 is purely illustrative in order to explain the process and is in no way restrictive for the present invention.

The tubular reactor (1) in which the polymerization takes place is composed of a steel tube, preferably a jacketed tube (2), which has an axially arranged stirrer shaft (3) internally which is equipped with several stirring elements (4). The tubular reactor (1) is equipped with a metering line (5) which is connected to an upstream mixing unit (6) for mixing the reactants. The tubular reactor (1) is connected via a withdrawal line (7) to a downstream vessel (8), in which the polymerization product is collected and optionally post-treated.

The starting materials can be introduced into the tubular reactor (1), preferably continuously, via the metering line (5). The polymerization product can be discharged from the tubular reactor (1), preferably continuously, through the withdrawal line (7). Via one or more further metering devices (9a) to (9e), further substances, preferably initiators, can be fed to the tubular reactor along the tubular reactor.

To reverse the direction of flow in accordance with the invention, the configuration according to FIG. 1 can be used, for example, to feed the reactant mixture (pre-emulsion) from the mixing unit (6) via the branch (5a) of the metering line (5) and via the open valve (10) to the tubular reactor (1). The polymerization product is fed to the vessel (8) via the open valve (11) and the section (7a) of the withdrawal line (7). The valve (12) and the valve (13) are closed in this phase of operation. To reverse the direction of flow, the valves (10) and (11) are closed, and then the valve (12) and the valve (13) are opened. In the following phase of operation, the reactant mixture is fed to the tubular reactor (1) from the mixing unit (6) via the branch (5b) of the metering line (5) via the open valve (12), and the polymerization product is withdrawn via the now open valve (13) and is fed to the vessel (8) by means of the section (7b) of the removal line (7). To reverse the direction of flow again, the valves (12) and (13) are closed and the valves (10) and (11) are opened again.

The polymerization is carried out according to the emulsion polymerization process in an aqueous medium, preferably no organic solvents being used. The polymerization temperature of the polymerization mixture in the tubular reactor is preferably between 40° C. and 120° C. and more preferably between 50° C. and 110° C. The pressure in the tubular reactor depends on whether the monomers to be polymerized are liquid or gaseous at the respective polymerization temperature and is preferably 1 to 110 $bar_{abs}$. In the copolymerization of gaseous comonomers such as ethylene, 1,3-butadiene or vinyl chloride, polymerization takes place under pressure, and more preferably 10 to 80 $bar_{abs}$.

The constituents of the reaction mixture (starting materials) can be mixed beforehand in a mixing unit and fed continuously to the tubular reactor. The constituents of the reaction mixture are preferably mixed continuously in a mixing unit to form a pre-emulsion and this is transported into the tubular reactor. In the case of thermal initiation, the procedure is preferably such that no oxidation catalyst is added to the pre-emulsion. In the case of initiation using a redox initiator combination, the procedure is preferably such that the reduction initiator is added to the pre-emulsion and the oxidation initiator is preferably added to the tubular reactor. The transport is effected by means of pumps or via the pure mass flow when the mixing unit is completely filled. The mixing unit can be, for example, a stirred tank or a static mixing section. The mixing unit can be provided with a double jacket in order to cool or heat, if necessary, during mixing.

The starting materials can be temperature-controlled before being introduced into the tubular reactor. For instance, one or more starting materials can be temperature-controlled to a temperature between 10° C. and the polymerization temperature when they are introduced into the tubular reactor. A mixture (pre-emulsion) comprising one or more ethylenically unsaturated monomers, one or more protective colloids and/or one or more emulsifiers, and optionally one or more initiators, in particular reduction initiators, is preferably temperature-controlled at a temperature just below the polymerization temperature, or at the polymerization temperature, before or when introduced into the tubular reactor. The aforementioned mixtures are preferably temperature-controlled to a temperature between the polymerization temperature and 20° C. below the polymerization temperature, in particular to 10° C. below the polymerization temperature. Initiators, in particular oxidation initiators, are more preferably added to a mixture temperature-controlled in this way immediately before being introduced into the tubular reactor or are metered directly into the tubular reactor. The temperature control can take place before, during or after the mixing thereof. Conventional heat exchangers can be used for this purpose.

The tubular reactor can be temperature-controlled using conventional cooling and/or heating devices, such as for example jacketed coolers or jacketed heaters. Cooling and/or heating devices can, for example, be attached to the wall of the tubular reactor or to built-in cooling coils. For example, the outer reactor wall can be provided with a cooling or heating jacket (jacketed tube), and a temperature-controlled liquid is passed through the space in between. A tubular reactor having a jacketed tube is preferably used.

Prior to the start of the polymerization, the tubular reactor is preferably filled with a polymer dispersion which preferably corresponds to the end product of the polymerization in terms of polymer composition, type and amount of protective colloid, and particle size and solids content. Alternatively, prior to the start of the process according to the invention, that is to say prior to the start of the polymerization, the tubular reactor can be filled with a mixture comprising the starting materials but no initiators, in particular no oxidation initiators. Finally, the tubular reactor can be filled with water, preferably exclusively with water, prior to the start of the process according to the invention.

The tubular reactor is generally operated continuously. In continuous operation during the emulsion polymerization, the starting materials, in particular ethylenically unsaturated monomers, protective colloids and/or emulsifiers and/or initiators, are introduced into the tubular reactor and the polymerization product is withdrawn from the tubular reactor. In the case of continuous operation, the incoming mass flows should correspond to the exiting mass flows.

The polymerization is generally carried out up to a conversion of at least 85% by weight, preferably up to a conversion of 90 to 99% by weight, of the monomers which are liquid under polymerization conditions. The polymerization product is then transferred to a collecting vessel (decompression vessel). The transport is effected by means of pumps or due to the pressure difference between the tubular reactor and the collecting vessel. In the collecting vessel, post-polymerization can optionally be carried out by applying known methods, for example by post-polymerization initiated by a redox catalyst. The volatile residual monomer content is then optionally removed by passing over or preferably passing through inert entrainment gases such as air, nitrogen or preferably water vapor over/through the aqueous polymerization mixture in a manner known to a person skilled in the art (stripping). Following post-treatment, the polymerization product is withdrawn from the collecting vessel and stored, for example in a silo.

The ethylenically unsaturated monomers are preferably selected from the group comprising vinyl esters, (meth)acrylic esters, vinyl aromatics, olefins, 1,3-dienes and vinyl halides and optionally other monomers copolymerizable therewith.

Suitable vinyl esters are those of carboxylic acids having 1 to 18 carbon atoms. Preference is given to vinyl acetate, vinyl propionate, vinyl butyrate, vinyl 2-ethylhexanoate, vinyl laurate, 1-methylvinyl acetate, vinyl pivalate, and vinyl esters of alpha-branched monocarboxylic acids having 9 to 11 carbon atoms, for example VeoVa9® or VeoVa10® (trade names of Hexion). Particular preference is given to vinyl acetate.

Suitable monomers from the group of acrylic esters or methacrylic esters are, for example, esters of unbranched or branched alcohols having 1 to 15 carbon atoms. Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, t-butyl acrylate, t-butyl methacrylate, 2-ethylhexyl acrylate. Particular preference is given to methyl acrylate, methyl methacrylate, n-butyl acrylate, t-butyl acrylate and 2-ethylhexyl acrylate.

Preferred vinyl aromatics are styrene, methylstyrene and vinyltoluene. The preferred vinyl halide is vinyl chloride. Preferred olefins are ethylene, propylene and preferred dienes are 1,3-butadiene and isoprene.

Optionally, from 0 to 10% by weight, based on the total weight of the monomer mixture, of auxiliary monomers can also be copolymerized. Preference is given to using 0.1 to 5% by weight auxiliary monomers. Examples of auxiliary monomers are ethylenically unsaturated mono- and dicarboxylic acids, preferably acrylic acid, methacrylic acid, fumaric acid, and maleic acid; ethylenically unsaturated carboxamides and carbonitriles, preferably acrylamide and acrylonitrile; mono- and diesters of fumaric acid and maleic acid such as the diethyl and diisopropyl esters, and also maleic anhydride; ethylenically unsaturated sulfonic acids and salts thereof, preferably vinylsulfonic acid, 2-acrylamido-2-methylpropanesulfonic acid. Further examples are pre-crosslinking comonomers such as polyethylenically unsaturated comonomers, for example diallyl phthalate, divinyl adipate, diallyl maleate, allyl methacrylate or triallyl cyanurate, or post-crosslinking comonomers, for example acrylamidoglycolic acid (AGA), methylacrylamidoglycolic methyl ester (MAGME), N-methylolacrylamide (NMA), N-methylolmethacrylamide, N-methylol allylcarbamate, alkyl ethers such as the isobutoxy ether or esters of N-methylolacrylamide, of N-methylolmethacrylamide and of N-methylol allylcarbamate. Also suitable are epoxide-functional comonomers such as glycidyl methacrylate and glycidyl acrylate. Further examples are silicon-functional comonomers, such as acryloxypropyltri(alkoxy)- and methacryloxypropyltri(alkoxy)silanes, vinyltrialkoxysilanes and vinylmethyldialkoxysilanes, in which ethoxy and ethoxypropylene glycol ether radicals for example may be present as alkoxy groups. Also included are monomers having hydroxy or CO groups, for example hydroxyalkyl esters of methacrylic acid and acrylic acid such as hydroxyethyl, hydroxypropyl or hydroxybutyl acrylate or methacrylate and also compounds such as diacetone acrylamide and acetylacetoxyethyl acrylate.

One or more monomers are preferably selected from the group comprising vinyl esters; vinyl ester mixtures comprising two or more monomers from the group comprising vinyl esters, olefins, vinyl aromatics, vinyl halides, acrylic esters, methacrylic esters, fumaric and/or maleic acid mono- or diesters; (meth)acrylic esters; (meth)acrylic ester mixtures comprising one or more monomers from the group comprising methacrylic esters, acrylic esters, olefins, vinyl aromatics, vinyl halides, fumaric and/or maleic acid mono- or diesters; monomers or monomer mixtures of dienes such as butadiene or isoprene, and of olefins such as ethene or propene, it being possible for the dienes to be copolymerized, for example, with styrene, (meth)acrylic esters or the esters of fumaric or maleic acid; monomers or monomer mixtures of vinyl aromatics, such as styrene, methylstyrene, vinyltoluene; monomers or monomer mixtures of vinyl halogen compounds such as vinyl chloride, it being possible for the monomer mixtures to also include auxiliary monomers.

Particular preference is given to monomer mixtures of vinyl acetate with 1 to 50% by weight ethylene; monomer mixtures of vinyl acetate with 1 to 50% by weight ethylene and 1 to 50% by weight of one or more further comonomers from the group of vinyl esters having 3 to 12 carbon atoms in the carboxylic acid radical, such as vinyl propionate, vinyl laurate, and vinyl esters of alpha-branched carboxylic acids having 9 to 11 carbon atoms such as VeoVa9®, VeoVa10®; monomer mixtures of one or more vinyl esters, 1 to 50% by weight ethylene and preferably 1 to 60% by weight (meth)acrylic esters of unbranched or branched alcohols having 1 to 15 carbon atoms, in particular n-butyl acrylate or 2-ethylhexyl acrylate; monomer mixtures with 30 to 75% by weight vinyl acetate, 1 to 30% by weight vinyl laurate or vinyl esters of an alpha-branched carboxylic acid having 9 to 11 carbon atoms, and also 1 to 30% by weight (meth)acrylic esters of unbranched or branched alcohols having 1 to 15 carbon atoms, in particular n-butyl acrylate or 2-ethylhexyl acrylate, which also comprise 1 to 40% by weight ethylene; monomer mixtures with one or more vinyl esters, 1 to 50% by weight ethylene and 1 to 60% by weight vinyl chloride; wherein the monomer mixtures mentioned may also comprise in each case the auxiliary monomers mentioned in the amounts cited, and the figures in % by weight in each case add up to 100% by weight.

Particular preference is also given to (meth)acrylic ester monomer mixtures, such as monomer mixtures of n-butyl acrylate or 2-ethylhexyl acrylate or copolymers of methyl methacrylate with n-butyl acrylate and/or 2-ethylhexyl acrylate; styrene-acrylic ester monomer mixtures with one or more monomers from the group comprising methyl acrylate, ethyl acrylate, propyl acrylate, n-butyl acrylate, 2-ethylhexyl acrylate; vinyl acetate-acrylic ester monomer mixtures with one or more monomers from the group comprising methyl acrylate, ethyl acrylate, propyl acrylate, n-butyl acrylate, 2-ethylhexyl acrylate and optionally ethylene; styrene-1,3-butadiene monomer mixtures; wherein the monomer mixtures mentioned may also comprise auxiliary monomers in the amounts mentioned, and the figures in % by weight in each case add up to 100% by weight.

Examples of particularly preferred comonomers for vinyl chloride monomer mixtures are α-olefins such as ethylene and propylene, vinyl esters such as vinyl acetate, acrylic esters and methacrylic esters of alcohols having 1 to 15 carbon atoms, such as methyl acrylate, methyl methacrylate, ethyl acrylate, ethyl methacrylate, propyl acrylate, propyl methacrylate, n-butyl acrylate, t-butyl acrylate, n-butyl methacrylate, t-butyl methacrylate, 2-ethylhexyl acrylate, fumaric and maleic acid mono- or diesters such as the dimethyl and diethyl esters of maleic acid and fumaric acid.

Most preferred are monomer mixtures with vinyl acetate and 5 to 50% by weight ethylene; monomer mixtures with vinyl acetate and 1 to 50% by weight ethylene and 1 to 50% by weight of a vinyl ester of α-branched monocarboxylic acids having 9 to 11 carbon atoms; monomer mixtures with 30 to 75% by weight vinyl acetate, 1 to 30% by weight vinyl laurate or a vinyl ester of an α-branched carboxylic acid having 9 to 11 carbon atoms, and also 1 to 30% by weight (meth)acrylic esters of unbranched or branched alcohols having 1 to 15 carbon atoms, which optionally also comprise 1 to 40% by weight ethylene; monomer mixtures with vinyl acetate, 5 to 50% by weight ethylene and 1 to 60% by weight vinyl chloride; and monomer mixtures comprising 60 to 98% by weight vinyl chloride and 1 to 40% by weight ethylene, wherein the monomer mixtures in each case may also comprise auxiliary monomers in the amounts mentioned, and the figures in % by weight add up to 100% by weight.

The monomer selection and the selection of the proportions by weight of the comonomers is generally made so as to result in a glass transition temperature Tg of −50° C. to +50° C., preferably −20° C. to +30° C. The glass transition temperature Tg of the polymers can be determined in a known manner by means of differential scanning calorimetry (DSC). The approximate Tg can also be predetermined using the Fox equation. According to Fox T. G., Bull. Am. Physics Soc. 1, 3, page 123 (1956): $1/Tg=x1/Tg1+x2/Tg2++xn/Tgn$, where xn is the mass fraction (wt %/100) of the monomer n and Tgn is the glass transition temperature in Kelvin of the homopolymer of the monomer n. Tg values for homopolymers are listed in Polymer Handbook 2nd Edition, JU. Wiley & Sons, New York (1975).

The polymerization is initiated with the customary initiators for emulsion polymerization, in particular redox initiator combinations of oxidation initiator and reduction initiator. Examples of suitable oxidation initiators are the sodium, potassium and ammonium salts of peroxodisulfuric acid, hydrogen peroxide and azobisisobutyronitrile. Preference is given to the sodium, potassium and ammonium salts of peroxydisulfuric acid and hydrogen peroxide. The initiators mentioned are generally used in an amount from 0.01 to 2.0% by weight, based on the total weight of the monomers.

Suitable reducing agents (reduction initiators) are the sulfites and bisulfites of alkali metals and of ammonium, for example sodium sulfite; the derivatives of sulfoxylic acid such as zinc or alkali metal formaldehyde sulfoxylates, for example sodium hydroxymethanesulfinate (Bruggolite) and ascorbic acid, isoascorbic acid or salts thereof; or formaldehyde-free reducing agents such as 2-hydroxy-2-sulfinato acetic acid disodium salt (Bruggolite FF6). The amount of reducing agent is preferably 0.015 to 3% by weight, based on the total weight of the monomers.

Chain transfer agents may be used to control the molecular weight during the polymerization. If such agents are used, these are typically used in amounts between 0.01 to 5.0% by weight, based on the monomers to be polymerized. Examples of such agents are n-dodecyl mercaptan, tert-dodecyl mercaptan, mercaptopropionic acid, ethyl mercaptopropionate, isopropanol and acetaldehyde. Preferably, no chain transfer agents are used.

Preference is given to polymerization in the presence of protective colloids. Suitable protective colloids are partially saponified polyvinyl alcohols; polyvinyl pyrrolidones; polyvinyl acetals; polysaccharides in water-soluble form such as starches (amylose and amylopectin), celluloses and carboxymethyl, methyl, hydroxyethyl, hydroxypropyl derivatives thereof; proteins such as casein or caseinate, soy protein, gelatin, lignosulfonates; synthetic polymers such as poly(meth)acrylic acid, copolymers of (meth)acrylates with carboxyl-functional comonomer units, poly(meth)acrylamide, polyvinylsulfonic acids and water-soluble copolymers thereof; melamine formaldehyde sulfonates, naphthalene formaldehyde sulfonates, styrene maleic acid and vinyl ether maleic acid copolymers; cationic polymers such as polydiallyldimethylammonium chloride (poly-DADMAC).

Preferred protective colloids are partially saponified or fully saponified polyvinyl alcohols. Particularly preferred are partially saponified polyvinyl alcohols having a degree of hydrolysis of 80 to 95 mol % and a Hoppler viscosity in 4% aqueous solution of 1 to 30 mPas (Hoppler method at 20° C., DIN 53015). Particular preference is also given to partially saponified, hydrophobically modified polyvinyl alcohols having a degree of hydrolysis of 80 to 95 mol % and a Hoppler viscosity in 4% aqueous solution of 1 to 30 mPas. Examples of these are partially saponified copolymers of vinyl acetate with hydrophobic comonomers such as isopropenyl acetate, vinyl pivalate, vinyl ethylhexanoate, vinyl esters of saturated alpha-branched monocarboxylic acids having 5 or 9 to 11 carbon atoms, dialkyl maleates and dialkyl fumarates such as diisopropyl maleate and diisopropyl fumarate, vinyl chloride, vinyl alkyl ethers such as vinyl butyl ether, olefins such as ethene and decene. The proportion of hydrophobic units is preferably 0.1 to 10% by weight based on the total weight of the partially saponified polyvinyl alcohol. It is also possible to use mixtures of the recited polyvinyl alcohols.

Most preferred are polyvinyl alcohols having a degree of hydrolysis of 85 to 94 mol % and a Höppler viscosity in 4% aqueous solution of 3 to 15 mPas (Höppler method at 20° C., DIN 53015). The protective colloids mentioned are accessible by methods known to those skilled in the art or are commercially available.

The protective colloids are generally added during the polymerization in a total amount of 1 to 20% by weight, based on the total weight of the monomers.

Optionally, emulsifiers can be used in the polymerization, for example anionic and/or non-ionic emulsifiers, for example 0.1 to 2.0% by weight, based on the total weight of the comonomers. Examples of anionic emulsifiers are alkyl sulfates having a chain length of 8 to 18 carbon atoms, alkyl or alkylaryl ether sulfates having 8 to 18 carbon atoms in the hydrophobic radical and up to 40 ethylene oxide or propylene oxide units, alkyl or alkylaryl sulfonates having 8 to 18 carbon atoms, esters and semiesters of sulfosuccinic acid with monohydric alcohols. Examples of non-ionic emulsifiers are $C_{12}$-$C_{14}$-fatty alcohol ethoxylates having a degree of ethoxylation of 2 to 20 ethylene oxide units.

The aqueous dispersions obtainable by the process according to the invention have a solids content of 30 to 75% by weight, preferably 50 to 60% by weight.

The aqueous dispersions can be used to produce polymer powders which are redispersible in water. For this purpose, the aqueous dispersions, optionally after the addition of protective colloids as a spraying aid, are dried by means of fluidized bed drying, freeze drying or preferably spray drying.

The aqueous polymer dispersions and the polymer powders redispersible in water can be used in the fields of application typical for these. For example, in construction chemical products, possibly in conjunction with hydraulical-setting binders such as cements, gypsum and water glass, for the production of building adhesives, in particular tile adhesives and composite thermal insulation adhesives, renders, troweling compounds, flooring compounds, leveling compounds, grouts, jointing mortars and paints. Also as binders for coating agents and adhesives or as coating agents or binders for textiles and paper.

The following examples serve to further elucidate the invention:

General Experimental Description

The polymerization was carried out in a tubular reactor (1) with a length of 1600 mm and an internal diameter of 100 mm. The reactor volume was ca. 12.5 liters. The reaction mixture was mixed transversely to the longitudinal axis by a stirrer (3) having 8 stirrer blades (4) measuring 50 mm×50 mm, the gap between the stirrer blades and the reactor wall being 25 mm, thus avoiding contact with the reactor wall. There were 5 further addition options (9a) to (9e) for initiator along the reactor axis.

The tubular reactor (1) was continuously supplied with the mixture of substances to be polymerized from an upstream pressure vessel (6) having a volume of 16 liters. The upstream pressure vessel (6) was continuously filled with the appropriate substances by means of pumps.

After leaving the tubular reactor (1), the product was transferred and collected in an unpressurized vessel (8) having a volume of 1000 liters via a pressure-maintaining valve (14) or (15). At the end of the experiment, the product mixture was post-treated and bottled.

Composition to be Polymerized:

The following substances were continuously fed to an upstream pressure vessel (stirred tank) (6) and premixed:

4.4 kg/h water, 4.0 kg/h of a 20% by weight aqueous solution of a partially saponified polyvinyl alcohol having a degree of hydrolysis of 88 mol % and a Floppier viscosity of 4 mPas (determined according to DIN 53015 at 20° C. in 4% by weight aqueous solution), 10.4 kg/h vinyl acetate, 1.15 kg/h ethylene, 195 g/h 5% by weight aqueous ascorbic acid solution, 1.5 g/h formic acid and 4 g/h 1% by weight aqueous iron ammonium sulfate solution.

This mixture was transferred to the tubular reactor (1) at a rate of 20 kg/h. The initiator potassium persulfate was metered in as a 3% by weight aqueous solution at the metering points (9a) to (9e). The finished product left the tubular reactor (1) at a conversion of ca. 92% and was collected in an unpressurized vessel (8) in vacuo.

To separate off excess ethylene, the dispersion was then transferred to a further unpressurized vessel in which a pressure of 0.7 bar was applied and was post-polymerized therein, by adding 0.4 kg of a 10% by weight aqueous t-butyl hydroperoxide solution and 0.8 kg of a 5% by weight aqueous ascorbic acid solution, based on 100 kg of dispersion, to a value of <1000 ppm residual vinyl acetate. The pH was adjusted to 4.5 by adding aqueous sodium hydroxide solution (10% by weight aqueous solution). Finally, the batch was filled from the unpressurized vessel through a 250 μm sieve.

Comparative Example 1 (Comparative Experiment)

The mixture to be polymerized was introduced at the lower end of the tubular reactor (1) and the product was removed at the upper end. In this case, the valves (10) and (11) were open and the valves (12) and (13) were closed. The flow rate was ca. 20 liters/h. The stirrer speed was 800 revolutions/minute. The pressure in the reactor (1) was adjusted to 55 bar via the transfer valve (14). The initiator metering rates were (9a) 0.11 kg/h
(9b) 0.11 kg/h
(9c) 0.21 kg/h
(9d) 0.30 kg/h
(9e) 0.40 kg/h After 24 h, the polymerization was terminated and the free volume of the reactor (1) was determined by filling with water and weighing the amount of water. With this procedure, the reactor volume was determined to be 11.2 liters, that is, in "normal operation" according to the prior art, the reactor loses a volume of ca. 1.3 liters after 24 hours, equivalent to a corresponding build-up of wall deposit.

Example 2 (Inventive Experiment)

The mixture to be polymerized was introduced at the lower end of the tubular reactor (1) and the product was removed at the upper end. In this case, the valves (10) and (11) were open and the valves (12) and (13) were closed. The flow rate was ca. 20 liters/h. The stirrer speed was 800 revolutions/minute. The pressure in the reactor (1) was adjusted to 55 bar via the transfer valve (14). The initiator metering rates were (9a) 0.11 kg/h
(9b) 0.11 kg/h
(9c) 0.21 kg/h
(9d) 0.30 kg/h
(9e) 0.40 kg/h After 12 hours, the direction of flow was reversed and the mixture to be polymerized was added from above and the product was removed at the lower end. Here, the valves (10) and (11) were closed and the valves (12) and (13) were opened. The pressure in the reactor was adjusted to 55 bar via the transfer valve (15). The initiator metering rates are (9a) 0.40 kg/h
(9b) 0.30 kg/h
(9c) 0.21 kg/h
(9d) 0.11 kg/h
(9e) 0.11 kg/h This switch was carried out every 12 hours and the system was operated for a total of 72 hours. With this procedure, the reactor volume was determined to be 12.4 liters at the end of the experiment, that is, with the procedure according to the invention, the reactor loses a volume of only 0.1 liters after 72 hours, which is equivalent to a negligible build-up of wall deposit.

In both examples, an end product with the following properties was obtained:

| Solids content | 58.5% |
|---|---|
| pH | 4.5 |

Viscosity (Brookfield at 23° C. and 20 rpm) 1500 mPas

Particle size distribution Dw (Beckmann Coulter) 1300 nm

Glass transition temperature (DSC according to ISO 11357) 16° C.

The invention claimed is:

1. A process for producing an aqueous polymer dispersion, comprising:
    polymerizing ethylenically by radically initiated emulsion polymerization in the presence of protective colloids and/or emulsifiers in a continuously operated tubular reactor, wherein a direction of flow of the reactor contents is reversed along the longitudinal axis of the reactor at regular time intervals.

2. The process of claim 1, wherein the direction of flow of the reactor contents is reversed within a time interval of 60 minutes to 48 hours.

3. The process of claim 1, wherein the direction of flow of the reactor contents is reversed within a time interval of 6 hours to 12 hours.

4. The process of claim 1, wherein stirred tubular reactors, unstirred tubular reactors, tubular reactors with mixing internals or Taylor reactors with a cylindrical stirrer are used as the tubular reactor.

5. The process of claim 4, wherein the mixing internals comprise a static mixer.

6. The process of claim 1, wherein the constituents of the reaction mixture are mixed beforehand in a mixing unit to give a pre-emulsion and are fed continuously to the tubular reactor.

7. The process of claim 1, wherein no oxidation catalyst is added to the pre-emulsion in the case of thermal initiation, and an oxidation initiator is added to the tubular reactor.

8. The process of claim 1, wherein in the case of initiation with a redox initiator combination, the reduction initiator is added to the pre-emulsion and the oxidation initiator is added to the tubular reactor.

9. The process of claim 1, wherein the reaction mixture is added in such a way that the residence time of the polymerization mixture in the tubular reactor is 10 minutes to 5 hours.

10. The process of claim 1, wherein one or more ethylenically unsaturated monomers are selected from the group consisting of vinyl esters, (meth)acrylic esters, vinyl aromatics, olefins, 1,3-dienes and vinyl halides.

* * * * *